(12) United States Patent
Eckert

(10) Patent No.: US 10,688,978 B2
(45) Date of Patent: Jun. 23, 2020

(54) METHOD FOR ADJUSTING BRAKE PRESSURES OF A MOTOR VEHICLE, BRAKE SYSTEM FOR CARRYING OUT THE METHOD AND MOTOR VEHICLE

(71) Applicant: WABCO GmbH, Hannover (DE)

(72) Inventor: Horst Eckert, Rehburg-Loccum (DE)

(73) Assignee: WABCO GMBH, Hannover (DE)

( * ) Notice: Subject to any disclaimer, the term of this patent is extended or adjusted under 35 U.S.C. 154(b) by 343 days.

(21) Appl. No.: 15/745,715

(22) PCT Filed: Jul. 22, 2016

(86) PCT No.: PCT/EP2016/001282
§ 371 (c)(1),
(2) Date: Jan. 18, 2018

(87) PCT Pub. No.: WO2017/050406
PCT Pub. Date: Mar. 30, 2017

(65) Prior Publication Data
US 2018/0208166 A1 Jul. 26, 2018

(30) Foreign Application Priority Data
Sep. 21, 2015 (DE) .......................... 10 2015 012 377

(51) Int. Cl.
*B60T 8/32* (2006.01)
*B60T 13/66* (2006.01)
(Continued)

(52) U.S. Cl.
CPC ............... *B60T 8/327* (2013.01); *B60T 7/12* (2013.01); *B60T 8/172* (2013.01); *B60T 13/662* (2013.01);
(Continued)

(58) Field of Classification Search
CPC ........ B60T 8/327; B60T 8/172; B60T 8/3255; B60T 7/12; B60T 13/662; B60W 10/192
See application file for complete search history.

(56) References Cited

U.S. PATENT DOCUMENTS 6,742,850 B1 * 6/2004 Eckert ..................... B60T 7/042
180/170
7,198,336 B2 * 4/2007 Yamamoto .............. B60T 7/042
188/158
(Continued)

FOREIGN PATENT DOCUMENTS

DE 102009058154 A1 6/2011
DE 112012006667 T5 4/2015
(Continued)

*Primary Examiner* — Nicholas Kiswanto
(74) *Attorney, Agent, or Firm* — Leydig, Voit & Mayer, Ltd.

(57) ABSTRACT

A method for adjusting brake pressures on pneumatically operated wheel brakes of a motor vehicle includes setting, in a normal braking mode, a brake pressure depending on a driver brake request determined by the driver of the motor vehicle and a control unit, during reception of an external brake request which is independent of the driver brake request, in a pressure control mode, sets a resulting brake pressure at the respective wheel brakes taking into account the external brake request and the driver brake request. The method further includes terminating, after revocation of the external brake request, the pressure control mode depending on a comparison of a value representing the driver brake request and entered into the control unit with a predefined threshold value.

16 Claims, 6 Drawing Sheets

(51) Int. Cl.
*B60T 7/12* (2006.01)
*B60T 8/172* (2006.01)
*B60T 13/68* (2006.01)
*B60W 10/192* (2012.01)

(52) U.S. Cl.
CPC .......... *B60T 8/3255* (2013.01); *B60T 13/683* (2013.01); *B60W 10/192* (2013.01)

(56) References Cited

U.S. PATENT DOCUMENTS

| | | | |
|---|---|---|---|
| 9,893,661 B2* | 2/2018 | Park | B60K 6/448 |
| 10,377,356 B2* | 8/2019 | Eckert | B60T 8/1708 |
| 2009/0171524 A1 | 7/2009 | Pitzal et al. | |
| 2011/0320067 A1* | 12/2011 | Ishikawa | B60T 1/10 |
| | | | 701/2 |
| 2012/0203438 A1 | 8/2012 | Breuer et al. | |
| 2015/0142292 A1 | 5/2015 | Kastner et al. | |

FOREIGN PATENT DOCUMENTS

| | | |
|---|---|---|
| EP | 0527005 A1 | 2/1993 |
| KR | 20030013748 A | 2/2003 |
| WO | WO 2006120128 A1 | 11/2006 |

* cited by examiner

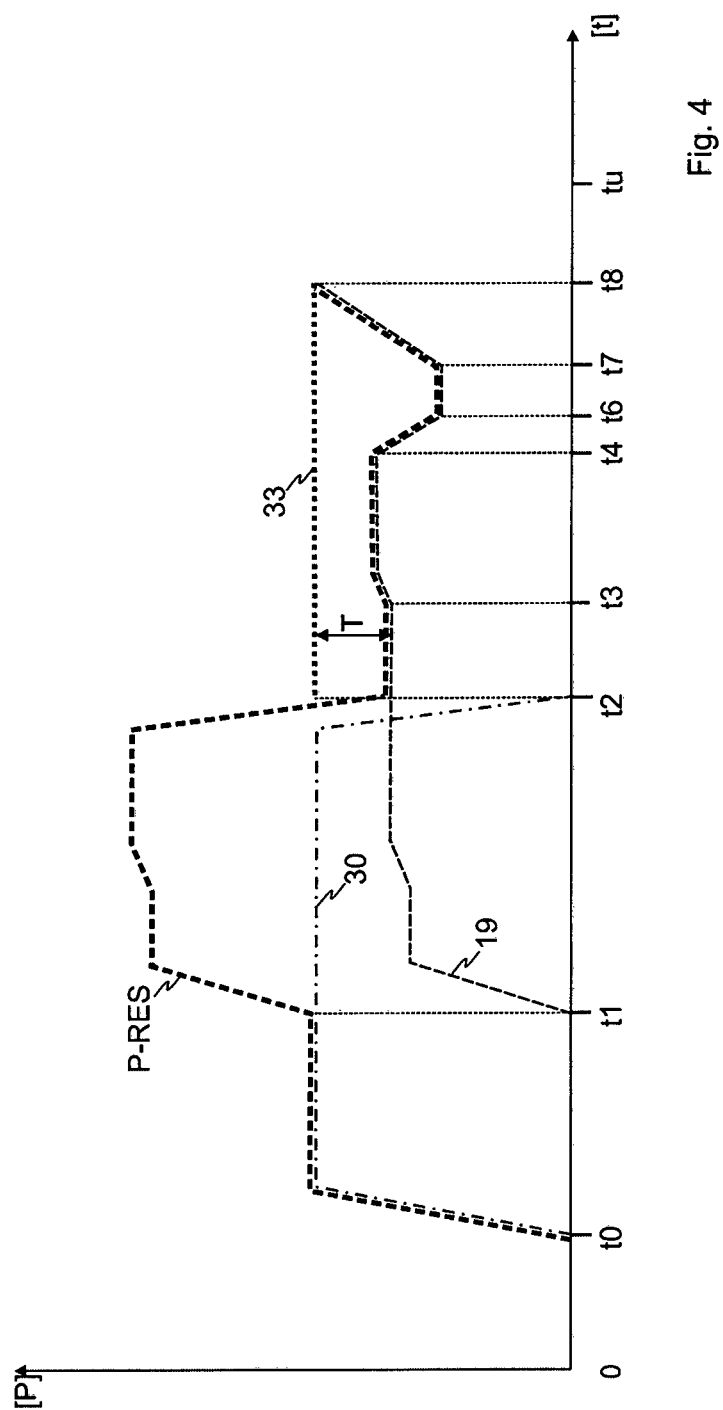

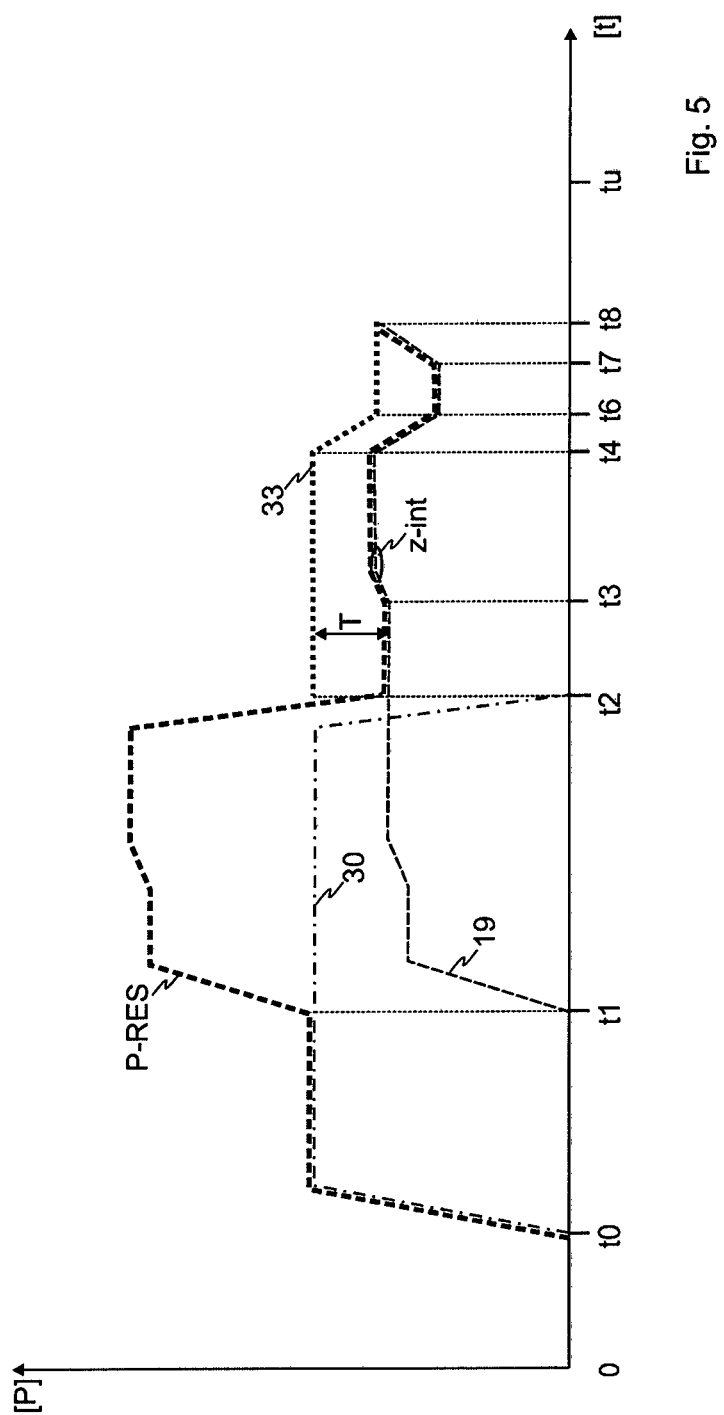

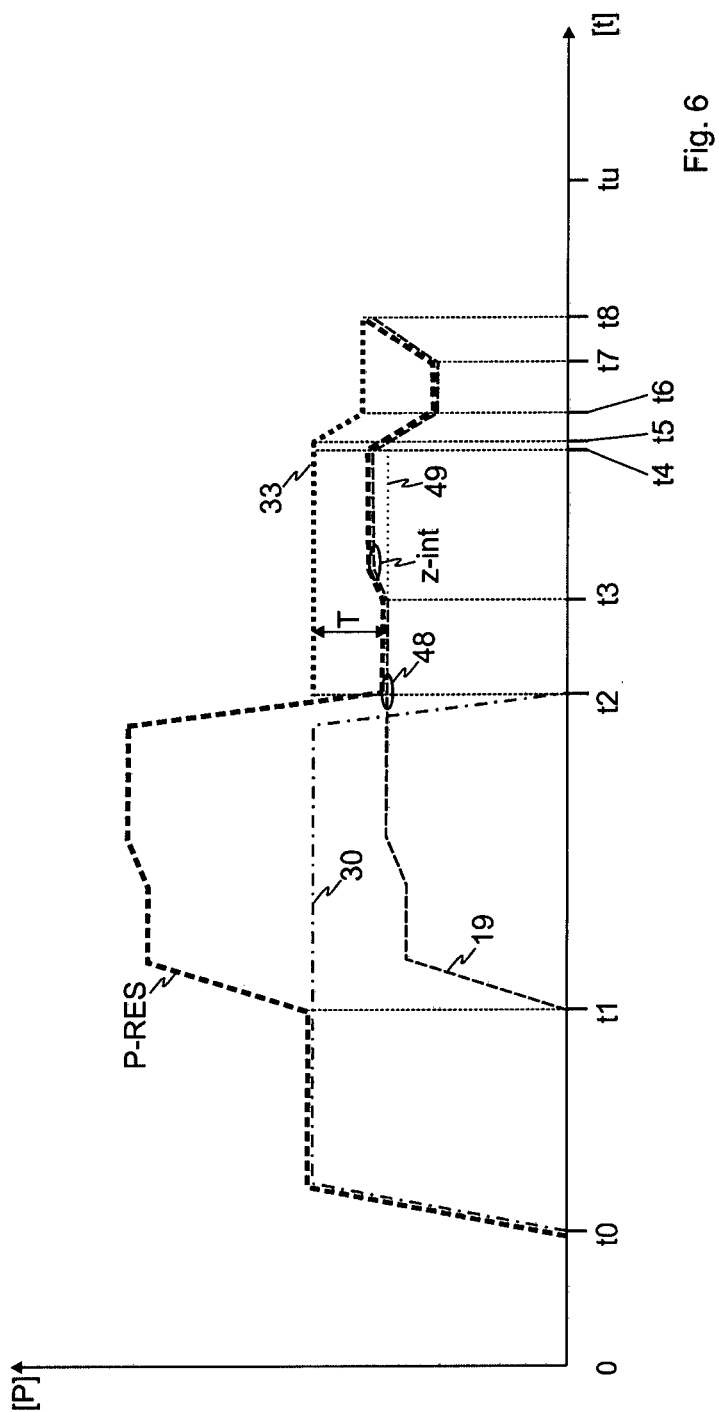

METHOD FOR ADJUSTING BRAKE PRESSURES OF A MOTOR VEHICLE, BRAKE SYSTEM FOR CARRYING OUT THE METHOD AND MOTOR VEHICLE

CROSS REFERENCE TO RELATED APPLICATIONS

This application is a U.S. National Stage Application under 35 U.S.C. § 371 of International Application No. PCT/EP2016/001282 filed on Jul. 22, 2016, and claims benefit to German Patent Application No. DE 10 2015 012 377.7 filed on Sep. 21, 2015. The International Application was published in German on Mar. 30, 2017 as WO 2017/050406 A1 under PCT Article 21(2).

FIELD

The invention concerns a method for adjusting brake pressures at pneumatically operated wheel brakes of a motor vehicle. The invention also concerns a brake system of a motor vehicle for adjusting brake pressures at pneumatically operated wheel brakes and a motor vehicle with such a brake system.

BACKGROUND

To brake a motor vehicle, the wheels of the motor vehicle are braked. In trucks in particular, brake cylinders of the wheels are actuated, wherein the necessary brake pressure is usually generated pneumatically. If the driver of the vehicle requests a braking via a brake pedal, in normal braking mode, the brake pressure is set depending on the driver brake request. As an alternative to normal braking mode, the brake pressure is set by a control unit at the respective wheel brakes and according to the specification from the control unit. DE 10 2009 058 154 A1 discloses a brake system, the control unit of which sets the necessary brake pressures in pressure control mode when braking needs are established. Such braking needs may for example be antilock braking interventions if a braking need is established at specific wheels. The known brake system also takes into account external brake requests, for example from an external driver assistance system. For example, the driver assistance system emits external brake request signals to the control unit via a databus of the vehicle. The control unit sends a resulting brake pressure to the respective wheel brakes taking into account the external brake request and the driver brake request. If the control unit receives an external brake request, and at the same time a driver brake request is made by the driver of the motor vehicle, the control unit of the known brake system overlays the driver brake request and the external brake request, so that the external brake request is implemented additionally or additively. Alternatively, in the known brake system, in a "maximum" mode, the control unit forms only the maximum value of the target deceleration values already requested internally by the brake system and the external target deceleration values, wherein the external brake request is set only if it is higher than the internal brake request. By linking the external brake request and the driver brake request into a resulting brake pressure, it is ensured that an external brake request is activated in pressure control mode even in the absence of a driver brake request.

When the control unit no longer receives an external brake request, or if the driver assistance system revokes the brake request, the known brake system terminates the pressure control mode and returns full control of the brakes to the driver in normal braking mode. In practical driving mode, at the moment of return to normal braking mode when control is restored to the driver, very often an unpleasant jerking of the vehicle occurs, or in other cases a sudden under-braking. Such inconsistencies in the braking behaviour of the motor vehicle often unsettle the driver, and may therefore be a source of danger to the safety of the motor vehicle in road traffic.

SUMMARY

In an embodiment, the present invention provides a method for adjusting brake pressures on pneumatically operated wheel brakes of a motor vehicle. The method includes setting, in a normal braking mode, a brake pressure depending on a driver brake request determined by the driver of the motor vehicle and a control unit, during reception of an external brake request which is independent of the driver brake request, in a pressure control mode, sets a resulting brake pressure at the respective wheel brakes taking into account the external brake request and the driver brake request. The method further includes terminating, after revocation of the external brake request, the pressure control mode depending on a comparison of a value representing the driver brake request and entered into the control unit with a predefined threshold value.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 4 is a graphic diagram of a temporal development of a resulting pressure build-up in pressure control mode according to a first variant of the embodiments of FIG. 2 and FIG. 3;

FIG. 5 is a graphic diagram of a temporal development of a resulting pressure build-up in pressure control mode according to a second variant of the embodiments of FIG. 2 and FIG. 3; and FIG. 6 is a graphic diagram of a temporal development of a resulting pressure build-up in pressure control mode according to a third variant of the embodiments of FIG. 2 and FIG. 3.

DETAILED DESCRIPTION

Figure 1:
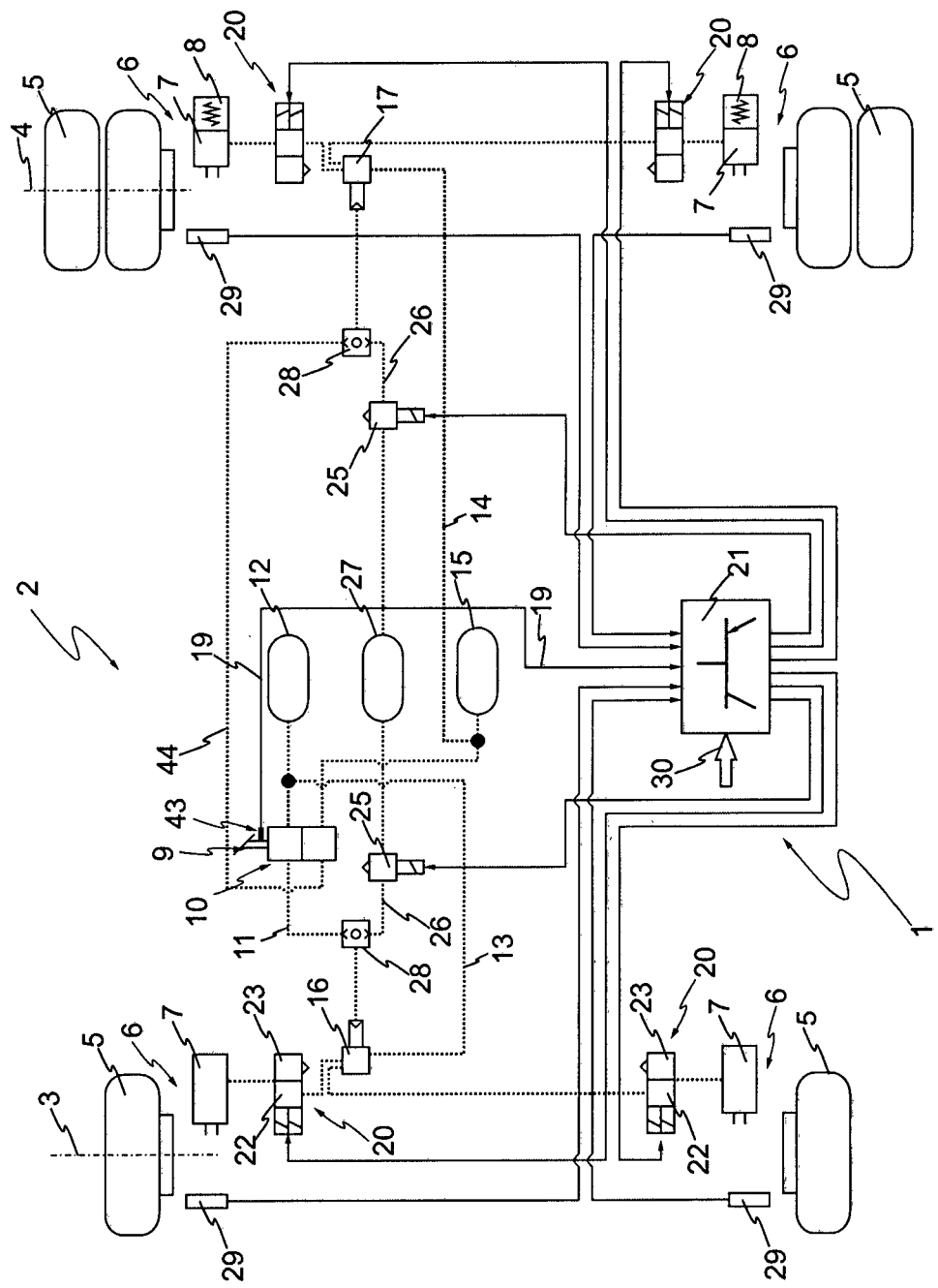
FIG. 1 depicts a pneumatic and electrical diagram of a brake system of a truck.

Embodiments of the present invention provide a steady braking behavior when setting the brake pressure in pressure control model after revocation of an external brake request.

According to embodiments of the invention, a threshold value for the termination of pressure control mode is predefined for the control unit of the brake system, wherein the control unit is configured to perform comparisons of a value representing the driver brake request with the predefined threshold value. The driver brake request is notified to the control unit via a value which quantitatively corresponds to the requested brake power and thus represents this. The value is the value of a physical variable which quantitatively determines the driver brake request. It contains information on a key figure and on the unit or dimension of the physical variable.

According to embodiments of the invention, after revocation of the external brake request, the pressure control mode is terminated depending on a comparison of the driver brake request with the predefined threshold value, whereby the driver of the motor vehicle is given full control over the braking behaviour only after fulfillment of a further criterion in addition to the revocation of the external brake request. The switch back from external braking mode to normal braking mode in fact only takes place when the control unit allows termination of the pressure control mode depending on the comparison of the driver brake request with the threshold value. Until then, despite revocation of the external brake request, the brake pressure is still set by the control unit in pressure control mode so that jerking or sudden under-braking is excluded. Until pressure control mode is terminated, the brake pressure is still under the pulse-modulated control of the control unit via the valves it actuates, for example the pressure control valves of the respective wheel brakes. As well as controlling the brake pressure according to the predefined brake request, in an alternative embodiment, the brake pressure may also be regulated.

The threshold value is advantageously predefined for the control unit in the same dimension as that of the value determining the driver brake request. Thus it is given in the dimension of the physical variable in which the control unit also processes the information of the driver brake request. In other words, the value corresponding to the driver brake request and the threshold value are processed in physical units with the same qualitative properties, in particular in a deceleration. Alternatively, the information on the driver brake request may also be converted by the control unit into a processable physical variable comparable to the threshold value.

Preferably, a desired deceleration is determined as the value representing the driver brake request. In this embodiment, the threshold value is also determined and predefined with the dimension of deceleration, i.e. negative acceleration of the vehicle. In this way, in pressure control mode, simple linking is possible of the driver brake request with the external brake request, which is usually requested by an external driver assistance system in the dimension of deceleration. From the deceleration values corresponding to the driver brake request and external brake request, a resulting target deceleration is determined which forms the basis for setting a resulting brake pressure at the wheel brakes. The driver's desired deceleration is derived from the measurement signals available from a brake signal emitter or the service brake valve coupled to the brake signal emitter for normal braking mode, for example from the measurement signals of a pressure sensor or a travel sensor of the brake signal emitter.

In an advantageous embodiment of the invention, pressure control mode is terminated when the driver brake request, or the value representing the driver brake request, exceeds the predefined threshold. This guarantees that pressure control mode is maintained if the driver brake request is only slight, and a steady braking behaviour is guaranteed, while if the driver brake request is sufficiently high to exceed the threshold value, the driver is given full control over the braking behaviour of the motor vehicle. As long as during the braking process, the driver brake request does not exceed the threshold value and also does not rise significantly again after a partial reduction in the driver brake request, but for example remains constant or falls, the brake pressure at the wheel brakes is set in pressure control mode and thus a steady braking behaviour is guaranteed.

In an advantageous embodiment, the value representing the driver brake request is stored at the time of revocation of the external brake request, and the threshold value is determined from the stored value. The threshold value is predefined until termination of the pressure control mode, and a comparison of the current driver brake request, i.e. the value in particular of the desired deceleration, with the threshold value is continually performed. According to embodiments of the invention, the pressure control mode is maintained until this threshold value is exceeded. If, in the further course of braking, the driver brakes further, pressure control mode is maintained as long as the driver brake request remains below the threshold value. If the driver brake request exceeds the threshold value, i.e. the driver requests more braking power than in the previous method loop with comparison with the driver brake request with the threshold value, pressure control mode is terminated immediately.

Advantageously, the threshold value to be predefined is formed by linking the stored value of the driver brake request with a tolerance value. The dimension of the tolerance value is between 1 and 10%, advantageously between 3 and 5% (when decelerations are predefined, advantageously 0.3 to 0.5 m/s$^2$).

Instead of a comparison of the driver brake request with the stored threshold value in the sense of a greater than/less than check (where applicable, taking into account a tolerance value), in a preferred embodiment of the invention, a continual update of the threshold value with the current value of the driver brake request is provided, wherein the updated threshold value forms the basis for the following comparison with the value of the driver brake request. Since, until termination of pressure control mode, continual comparisons of the current values of the driver brake request with the stored threshold value are performed, for each of the temporally discrete comparisons, the respective threshold value forms the basis of the following comparison with a current driver brake request. In this way, the return to normal braking mode is as rapid and smooth as possible. This is preferably further supported in that increases in the driver brake request are not taken into account in the update of the threshold value.

In a further advantageous embodiment, the pressure control mode is terminated depending on a comparison of a current speed and a predefined switching speed value. Monitoring of the current speed remains a further criterion for terminating the pressure control mode after a revocation of the external brake request. It is in fact probable that the current braking will be ended immediately if, after revocation of the external brake request and the existing driver brake request, the speed is less than the predefined switching speed and the motor vehicle has stopped. In this situation, smooth braking behaviour must be ensured with high priority. At vehicle speeds above the switching speed, for example 30 km/h, a jump in brake pressure at the wheel brakes on switching from pressure control mode to normal braking mode will have comparatively significantly less impact, and in this embodiment is weighted with lower priority than the driver's need for control of the braking behaviour (normal braking mode), which must be taken into account above all on braking in the lower speed range, in particular on braking to a standstill.

In order to ensure a switch back to normal braking mode for every possible braking development and combination of external and internal brake requests, pressure control mode is terminated after expiry of a predefined duration since the external brake request was revoked. The predefined time window is around two to fifteen seconds, for example eight seconds. When the time has elapsed, in any case the driver is given full control over the braking behaviour of the vehicle.

In a preferred embodiment of a brake system according to the invention, the control unit is part of an anti-lock braking system and evaluates dynamic state variables of the wheels to be braked. If one or more wheels show a blocking tendency, the control unit controls or regulates the brake pressure of the wheel brakes concerned in pressure control mode. Intervention measures of the anti-lock braking system can thus be designated as internal brake requests, which the control unit itself determines on the basis of the continually supplied measured values of the dynamic state variables of the wheels to be braked, and where necessary adapts or regulates the brake pressure at specific wheel brakes in pressure control mode. The pressure control mode in which the control unit actively influences the brake pressure is also used to control external brake requests, for example an external brake request of the driver assistance system.

Preferably, the control unit controls the brake pressures at the wheel brakes via a respective pressure control valve. The brake circuits of the pressure control valves can be connected to a pressure medium store by activation of a respective actuation valve per brake circuit. The actuation valves are switched by the control unit. At the end of pressure control mode, the actuation valve of the brake circuit concerned is brought by the control unit to the closed position, whereby the connection of the connected pressure control valves to the pressure medium store is separated. In normal braking mode, the brake pressure at the wheel brakes can be influenced only depending on the driver brake request, namely in particular via a service brake valve, the position of which can be changed by means of a drive pedal in the driver's cab.

The actuation valves are advantageously configured as 3/2-way directional control valves, whereby the pressure line behind the actuation valve can be purged if required.

The arrangement of the actuation valves in the respective brake circuits allows an immediate termination of the pressure control mode by isolation of the pressure control valves from the respective pressure medium store, so that it is possible to switch rapidly from pressure control mode to normal braking mode. Advantageously, the wheel brakes and the pressure control valves assigned to the wheel brakes of one axle are arranged in a common brake circuit, and in pressure control mode are actuated via a common actuation valve of the brake circuit concerned.

Embodiments of the invention are advantageous in particular in trucks which are equipped with pneumatically operable wheel brakes.

FIG. 1 shows an electric-pneumatic diagram of a brake system 1 of a motor vehicle 2, in particular a truck. Electrical lines are depicted with solid lines, and pneumatic lines with dotted lines. The motor vehicle 2 in the exemplary embodiment shown comprises two axles, namely a front axle 3 and a rear axle 4, on which wheels 5 are arranged on both sides.

To brake the wheels 5, a wheel brake 6 is assigned to each wheel 5. The wheel brakes 6 can be activated pneumatically and each have a brake cylinder 7. The wheel brakes 6 exert a brake force on the rotating wheel 5 according to the pneumatic brake pressure present in the respective brake cylinder 7. Brake cylinders 7 with spring accumulators 8 are provided on the wheels 5 of the rear axle 4 and serve as a parking brake.

A brake pedal 9, which is coupled to a service brake valve 10, is arranged In the driver's cab of the motor vehicle 2. The driver of the motor vehicle 2, by actuating the brake pedal 9, can switch pneumatic pressure through to the brake cylinders 7 and hence actuate the wheel brakes 6. For this, the service brake valve 10 controls pneumatic brake lines 11, 44 between the pressure medium stores 12, 15 and the brake cylinders 7.

In the exemplary embodiment shown, the wheel brakes 6 of the front axle 3 are assigned to a common first brake circuit 13, while the wheel brakes 6 of the rear axle 4 can be actuated by a second brake circuit 14. The first pressure medium store 12 is here assigned to the first brake circuit 13 and connected to the brake cylinders 7 of the front axle 3 by the brake line 11. The second brake circuit 14 of the rear axle 4 is supplied with pressure medium via a second pressure medium store 15. The second brake circuit 14 is structured similarly to the first brake circuit 13, i.e. the brake line 44 between the second pressure medium store 15 and the wheel brakes 6 of the rear axle 4 can be opened via the service brake valve 10 and hence the brake pressure can be set depending on the position of the brake pedal 9.

A pneumatically actuatable relay valve 16 is arranged in the first brake circuit 13, and similarly a relay valve 17 is arranged in the second brake circuit 14. The pneumatically actuatable relay valves 16, 17 are opened via the pneumatic pressure from the respective connected pressure medium store 12, 15. If the service brake valve 10 is opened, the relay valves 16, 17 switch the brake pressure present through to the connected wheel brakes 6. In a normal braking mode (reference sign 18 in FIG. 2), the brake pressure in the wheel brakes 6 can be set depending on the driver brake request (reference sign 19 in FIG. 2, FIG. 3). In normal brake mode 18 therefore, the driver of the motor vehicle 2 has, via actuation of the brake pedal 9, full control over the braking behaviour of the motor vehicle 2.

A pressure control valve 20 is assigned to each wheel brake 6 of the brake system 1, and is activated electrically by the control unit 21. The pressure control valves 20 of the wheel brakes 6 of the front axle 3 are arranged in the first brake circuit 13, and the pressure control valves 20 of the rear axle 4 are arranged in the second brake circuit 14. The pressure control valves 20 are each a combination of at least two magnetic valves, namely an inlet valve 22 and an outlet valve 23. The inlet valve 22 serves in principle to increase the pressure or maintain the pressure in the brake cylinder 7, while the outlet valve 23 is opened to reduce the brake pressure and purge the respective connected brake cylinder 7. In the exemplary embodiment, the inlet valve 22 and the outlet valve 23 are 2/2-way directional control valves which can be actuated electrically by the control unit 21. In normal braking mode 18, the inlet valves 22 are switched into the open position and the outlet valves 23 into the closed position, so the brake pressure is switched through.

Figure 2:
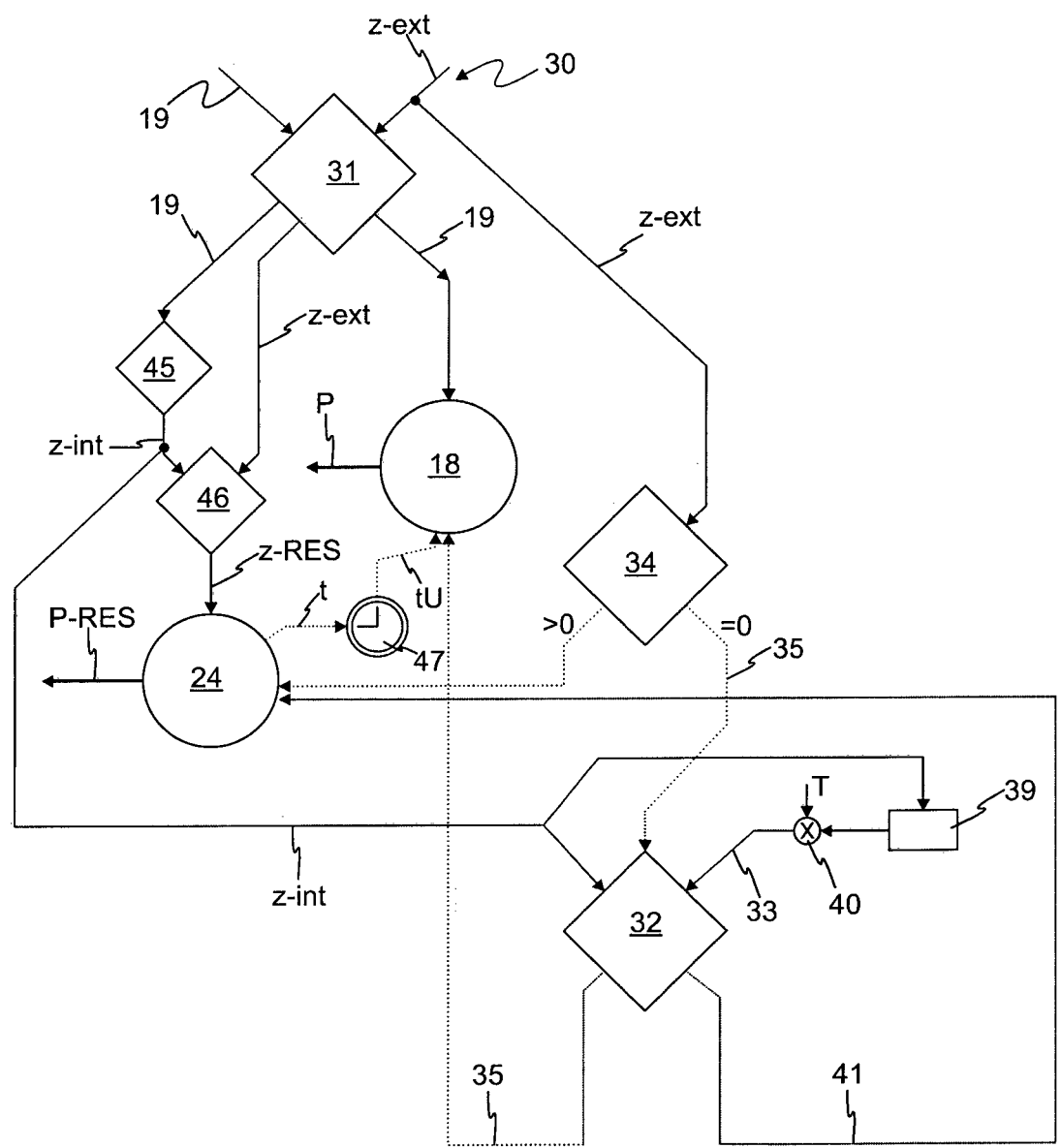
FIG. 2 is a flow diagram of a method for adjusting the brake pressures in a brake system according to an embodiment.
Figure 3:
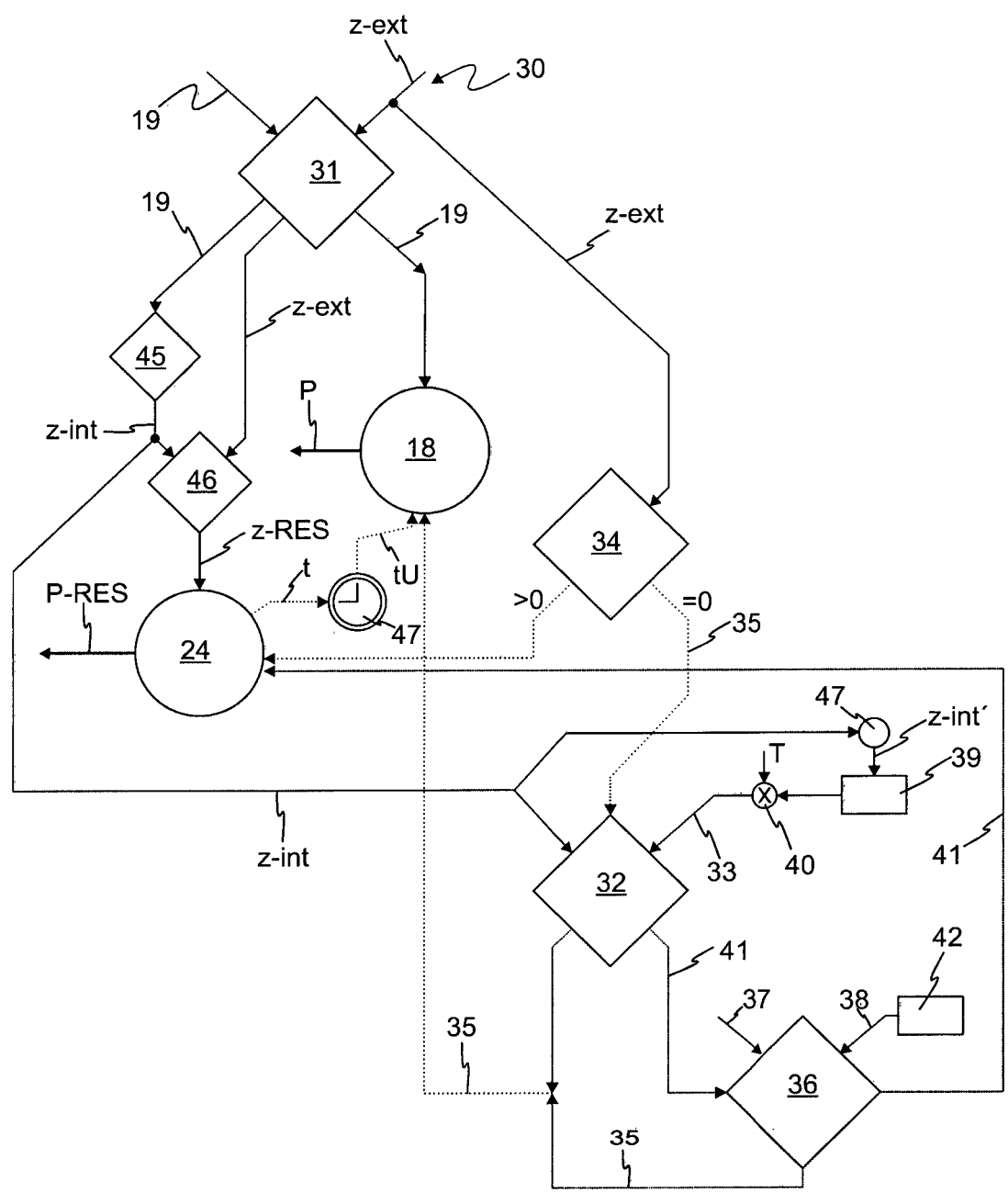
FIG. 3 is a flow diagram of a method for adjusting the brake pressures in a brake system according to a second embodiment.

The pressure control valves 20 are actuated by the control unit 21 in a pressure control mode (reference sign 24 in FIG. 2, FIG. 3). In pressure control mode 24, the control unit 21 performs the adjustment of the brake pressure of the respective wheel brakes 6 by corresponding actuation of the pressure control valves 20. An electrically operable actuation valve 25 is assigned to each brake circuit 13, 14, and can be actuated by the control unit 21. Each actuation valve 25 is configured as a 3/2-way directional control valve, whereby the pressure line behind the actuation valve can be purged if required. In pressure control mode 24, by control of the actuation valves 25, brake pressure can be switched through to the pressure control valves 20. In the exemplary embodiment shown, the actuation valves 25 each control a pressure line 26 from a third pressure medium store 27 to the relay valves 16, 17. By operation of the actuation valves 25 of the first brake circuit 13, the relay valve 16 of the front axle 3 can thus be actuated. Similarly, the relay valve 17 of the rear axle 4 is actuated by operation of the actuation valve 25 of the second brake circuit.

The service brake valve 10 and the actuation valves 25 are each coupled via a twin check valve 28 to the pneumatic control input of the relay valve 16, 17 of the respective brake circuit 13, 14.

The control unit 21 is here formed and configured to act autonomously on the brake process in pressure control mode 24, independently of the driver brake request 19. For this, the control unit 21 determines a specific target brake pressure and inputs this target brake pressure at the respective wheel brakes 6 by actuation of the pressure control valves 22. The decision on a braking action and determination of the corresponding target brake pressure is made by the control unit 21 on the basis of the information supplied to it. The brake circuit 1 comprises an anti-lock braking system, wherein the control unit 21 continually receives the determined dynamic state variables of the wheels 5. For this, a rotation speed sensor 29 is assigned to each wheel 5, the measurement signals from which are sent to the control unit 21.

By adjusting the brake pressures in pressure control mode 24, the control unit 21 is implementing not only internal brake requests, which are predefined on the basis of the dynamic state variables of the vehicle supplied to it, but also external brake requests 30. The external brake request 30 is predefined by a driver assistance system. An external brake request 30 is a request for braking power from one or more driver assistance systems or other external systems which request a braking manoeuvre as a result of their function in the motor vehicle 2. On receipt of an external brake request 30, the control unit 21 switches from normal braking mode 18 to pressure control mode 24, and performs the control or regulation of the brake pressures at the individual wheels 5.

If the external brake request 30 is revoked, i.e. the control unit 21 no longer receives an external brake request 25, the control unit 21 initiates a termination of the pressure control mode 24 provided that no driver brake request 19 has been issued, i.e. as long as the driver is not also braking. This situation is explained in more detail below with reference to FIG. 2 and FIG. 3. By termination of pressure control mode 24, the driver of the motor vehicle 2 thus resumes complete control of the actuation of the wheel brakes 6 in normal braking mode 18.

The brake system 1 comprises a brake signal emitter 43 which is connected to the control unit 21 so as to transmit signals. The output signal of the brake signal emitter 43 corresponds to the driver brake request 19, wherein for example the position or an actuation travel of the brake pedal 9, an actuation travel of a component of the service brake valve 10, or a brake pressure triggered by the service brake valve 10 may be measured. The driver brake request 19 is notified to the control unit 21 via the signal-transmitting connection. Thus the control unit 21 is able, in pressure control mode 18, to take account of an additional braking of the driver, i.e. an additional driver brake request 19 occurring simultaneously with the external brake request 30.

The control unit 21 takes account both of the driver brake request 19 and the external brake request 30 in a method for determining the brake pressure which is described below with reference to FIGS. 2, 3, 4 and 5. In normal braking mode 18, the brake pressure is always set solely depending on the driver brake request 19 or a target pressure P-Soll corresponding to the driver brake request 19, as long as the control unit does not detect any external brake request 30. In normal braking mode 18, the control unit does not intervene in the setting of the brake pressure. The inlet valves 22 of the pressure control valves 20 remain open and the outlet valves 23 remain closed, whereby the driver has full control.

If the control unit 21 receives an external brake request 30, in pressure control mode 24, the control unit 21 sets a resulting brake pressure P-RES at the wheel brakes taking into account the external brake request 30 and any simultaneous driver brake request 19. In an advantageous exemplary embodiment, the resulting brake pressure P-RES is formed by addition of the driver brake request 19 and the external brake request 30 or the target brake pressures corresponding to these brake requests.

In a mode detection step 31, the control unit detects the brake requests to be taken into account, namely the driver brake request 19 and the external brake request 30. If there is no external brake request 30, as a resulting brake pressure P-RES, the brake pressure of normal braking mode 18 which corresponds to the driver brake request 19 may be switched through.

In pressure control mode 24, the control unit 21 receives the external brake request 30 of an external driver braking assistance system as the external target deceleration z-ext. The driver brake request 19 is predefined for the control unit 21 by a measurement signal of a brake signal emitter 43 (FIG. 1) or a pressure sensor assigned to the service brake valve 10. In a conversion step 45, a desired deceleration z-int is determined from the measurement signal as the value representing the driver brake request 19. The desired deceleration z-int and the target deceleration z-ext are linked in a linking step 46 to form a resulting target deceleration z-RES. On the basis of the target deceleration z-RES formed, the control unit 21 determines the resulting brake pressure P-RES in pressure control mode 24. In one exemplary embodiment, the internal desired deceleration z-int and the external target deceleration z-ext are added together. Alternatively, the resulting brake pressure P-RES may also be set to the value of the highest of the several brake requests 19, 30 to be taken into account.

After the external brake request 30 has been revoked, during pressure control mode 24, the sequence of the method for adjusting brake pressures enters a termination path 35 which represents the process of termination of the pressure control mode 24 and hence the resumption of normal braking mode 18. The pressure control mode 24 is here not necessarily terminated immediately on revocation of the external brake request 30, but in addition depending on a comparison 32 of the driver brake request 19 with a predefined threshold value 33. The pressure control mode 24 is here terminated after the value of the driver brake request 19 exceeds a predefined threshold value 33.

As long as the presence of an external brake request 30 is established in a check 34, the system remains in pressure control mode 24. As soon as the external brake request 30 or the external target deceleration z-ext requested by the control unit 21 assumes a value of zero, the comparison 32 is made of the driver brake request 19 or desired deceleration z-int, which expresses the driver brake request 19 as a physical variable, with the predefined threshold 33.

In an exemplary embodiment of the invention, on revocation of the external brake request 30, the driver brake request 19 is stored and the threshold value 33 determined from the stored desired deceleration (z-int) of the driver brake request 19. The threshold value 33 which is determined qualitatively by the driver brake request 19 is weighted with a predefined tolerance value T via a linking element 40. The tolerance value T advantageously amounts to 3 to 5% (0.3 to 0.5 m/s$^2$).

To store the driver brake request 19 or a physical variable—here a deceleration—corresponding to the driver brake request 19, a memory element 39 is provided. As soon as the currently established driver brake request 19 exceeds the threshold value 33, pressure control mode 24 is terminated so that in normal braking mode 18, the brake pressures can be set directly with full control by the driver of the motor vehicle. This process is represented in the diagram by the further course of the termination path 35. If the comparison 32 shows a driver brake request 30 below the threshold value 33, the method for adjusting the brake pressures P remains in pressure control mode 24, which is indicated by the reset loop 41. In the exemplary embodiment according to FIG. 2, the same threshold value 33, which was determined from the driver brake request 19 on revocation of the external brake request 30, is continually predefined for the comparison 24.

FIG. 3 shows a flow diagram of a second exemplary embodiment of a method for adjusting the brake pressures in a brake system. With the exception of the differences described below, the method corresponds to the exemplary embodiment according to FIG. 2. In the exemplary embodiment according to FIG. 3, a continual update 47 takes place of the threshold value 33 with the current value z-int' of the driver brake request 19. The updated threshold value 33 then forms the basis for the following comparison 32 with the then applicable desired deceleration z-int of the driver brake request 19. This means that the value stored in the memory element 39 is replaced by the current value of the driver brake request 19 or a physical variable corresponding to the driver brake request 19, here the desired deceleration z-int, and provided for the following method loop with a comparison 32. The updated threshold value 33 then forms the basis for the following comparison 32 with a current desired deceleration (z-int). Since pressure control mode 24 is terminated as soon as the driver brake request is greater than the threshold value 33, the update is performed in an update loop only as long as the current desired deceleration (z-int) is less than the last value stored.

Also, in contrast to the exemplary embodiment of FIG. 2, in the exemplary embodiment of the operating method according to FIG. 3, a further criterion is provided for termination of pressure control mode 24. After the comparison 32 of the current driver brake request 19 with the threshold value 33, on the termination path 35, in addition, a comparison 36 is made of the speed 37 of the vehicle with a predefined switching speed 38. The pressure control mode 24 is terminated if the check 34 has shown the presence of a value of zero for the external brake request 30, and the current speed 37 of the vehicle has exceeded the predefined switching speed 38. With a current speed 37 less than the switching speed 38, the brake pressure is still adjusted in pressure control mode 24. In an advantageous exemplary embodiment, the switching speed 38 is 30 km/h. This ensures that, on a braking in which an external brake request 30 has been overlaid with a driver brake request 19, i.e. the driver is braking in addition to a simultaneous external brake request 30, the system remains in pressure control mode 24 after the external brake request 30 has been revoked and the driver brake request 19 is still in force. Therefore in the sensitive speed range below the switching speed 38, if the driver brake request 19 increases up to the threshold value 33 or if the driver brake request 19 changes to a smaller value of the driver brake request 19, no jerking or underbraking occurs as a result of termination of pressure control mode 24 on transition to normal braking mode 18. The value of the switching speed 38 is stored in a memory element 42.

Both in the exemplary embodiment according to FIG. 2 and in the exemplary embodiment according to FIG. 3, the reset loop 41 of the continual comparisons 42 of the driver brake request 19 with the predefined threshold value 22 is temporally limited. For this, a time detection unit 47 is provided, wherein the time t from revocation of the external brake request 30 is detected. After expiry of a predefined duration to since revocation of the external brake request 30, pressure control mode 24 is forcibly terminated even if the driver brake request 19 has not exceeded the threshold value 33. The predefined duration for termination of pressure control mode 24 is between two and fifteen seconds, for example eight seconds.

FIGS. 4 and 5 show graphic diagrams with a stylised curve of an exemplary resulting brake pressure P-RES during a braking process, in pressure control mode, for adjusting the brake pressure P-RES in a method of the invention according to one of the exemplary embodiments described above. The resulting brake pressure P-RES is here determined taking into account the driver brake request 19 and the external brake request 30 (FIGS. 2, 3) which are also depicted in the diagram as time-related curves.

The resulting brake pressure P-RES substantially only contains the proportion of the external brake request 30 from time t0 to time t1 at which the driver brakes additionally. If, as in the preferred exemplary embodiment, the external brake request 30 is requested by a driver assistance system in the dimension "deceleration", the requested target deceleration is converted directly into a target brake pressure without considering an influence of any braking power additionally requested. Between times t1 and t2, the resulting brake pressure P-RES contains proportions corresponding both to the external brake request 30 and to the additional driver brake request 19. At time t2, the external brake request 30 is reduced to the value zero and only a driver brake request 19 remains. According to an embodiment of the invention, the system does not now switch spontaneously into normal braking mode, but the brake pressure is still determined as P-RES by the control unit 21 (FIG. 1) in pressure control mode.

At time t2, after the external brake request 30 has reduced to zero, the value of the driver brake request 19 is stored and determined from the stored value of the threshold value 33 with additional consideration of the tolerance value T (FIG. 2, 3). In the further course of braking, the system switches to normal braking mode and the driver is given full and exclusive control of the braking process only when the driver brake request 19 exceeds a threshold value 33.

In the exemplary braking curve, the driver brake request 19 rises at time t3 and falls again in the interval between times t4, t6. From time t7, the driver of the motor vehicle again requests more braking power, and at time t8 the driver brake request 19 exceeds a threshold value 33 so that pressure control mode is terminated.

In the exemplary embodiment according to FIG. 4, a constant threshold value 33 is determined which is predefined until termination of the pressure control mode at time t8.

FIG. 5 shows in stylised form an exemplary embodiment of the invention with the same curves of the driver brake request 19 and external brake request 30, wherein in contrast to the depiction in FIG. 4, in pressure control mode, after reduction of the external brake request 30 to zero, an update (FIG. 3) of the threshold value 33 takes place depending on the driver brake request 19 and tolerance value T. For this, the control unit 21 continually updates the threshold value 33 with the current value z-int' of the driver brake request 19, wherein the updated threshold value 33 forms the basis for the following comparison 32 with the then applicable value z-int of the driver brake request 19 (see description of FIG. 3). In the exemplary embodiment according to the graphic diagram of FIG. 5, the threshold value 33 is updated if the driver brake request 19 is smaller than the driver brake request 19 of the preceding update loop. Increases in the driver brake request 19 are not taken into account on the update, here from time t4, so that a rapid switch back to normal operating mode is guaranteed.

In the exemplary embodiment according to FIG. 3 and the associated stylised diagram in FIG. 5, the threshold value 33 is updated between times t4 and t6 and again between times t6 and t7, but not during the rise in driver brake request 19 after time t3. At no time is the threshold value 33 increased.

FIG. 6 shows in stylised form a variant of the exemplary embodiment, described with reference to FIG. 5, of a method for determining the brake pressures, wherein in pressure control mode, after the external brake request 30 has been reduced to zero, a continual update (FIG. 3) of the threshold value 33 takes place depending on the driver brake request 19. The threshold value 33 is updated in a manner similar to that of FIG. 5 if the driver brake request 19 is smaller than the driver brake request 19 of the preceding update loop. In contrast to the exemplary embodiment according to FIG. 5, the threshold value 33 is only updated if the actual value, i.e. the target deceleration z-int, is less than a reference value 48 of the value representing the driver brake request at a specific earlier time. In the exemplary embodiment shown, the desired deceleration at time t2, at which the external brake request 30 is reduced to zero, is used as the reference value 48. In the exemplary braking characterized by the curves in FIGS. 4, 5, 6, after the intermediate increase in driver brake request 19, from time t3, the level of the reference value is reached only at time t5 and the threshold value updated after this time. There is no increase in the threshold value to be defined, compared with the value taken from the level 49 of the reference value 48.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Brake system
2 Motor vehicle
3 Front axle
4 Rear axle
5 Wheel
6 Wheel brake
7 Brake cylinder
8 Spring accumulator
9 Brake pedal
10 Service brake valve
11 Brake line
12 Pressure medium store
13 First brake circuit
14 Second brake circuit
15 Second pressure medium store
16 Relay valve
17 Relay valve
18 Normal braking mode
19 Driver brake request
20 Pressure control valve
21 Control unit
22 Inlet valve
23 Outlet valve
24 Pressure control mode
25 Actuation valve
26 Pressure line
27 Third pressure medium store
28 Twin check valve
29 Rotation speed sensor
30 External brake request
31 Detection
32 Comparison
33 Threshold value
34 Check
35 Termination path
36 Comparison
37 Speed
38 Switching speed
39 Memory element
40 Linking element
41 Reset loop
42 Memory element
43 Brake signal emitter
44 Brake line
45 Conversion step
46 Linking step
47 Update
48 Reference value
49 Level
T Tolerance value
P Brake pressure
P-Soll Target pressure P-RES Resulting brake pressure
z-int Desired deceleration
z-int' Current value
z-ext External target deceleration
z-RES Resulting target deceleration
t1 Time
t2 Time
t3 Time
t4 Time
t5 Time
t6 Time
t7 Time
t8 Time
tu Predefined duration

The invention claimed is:

1. A method for adjusting brake pressures on pneumatically operated wheel brakes of a motor vehicle, the method comprising:
setting, in a normal braking mode, a brake pressure depending on a driver brake request determined by the driver of the motor vehicle and a control unit, during reception of an external brake request which is independent of the driver brake request, in a pressure control mode, sets a resulting brake pressure at the respective wheel brakes taking into account the external brake request and the driver brake request,
terminating, after revocation of the external brake request, the pressure control mode depending on a comparison of a value representing the driver brake request and entered into the control unit with a predefined threshold value.

2. The method as claimed in claim 1, wherein the pressure control mode is terminated after the value representing the driver brake request exceeds the predefined threshold value.

3. The method as claimed in claim 1, wherein the threshold value is predefined in a same dimension as the value representing the driver brake request, wherein the value representing the driver brake request is stored on revocation of the external brake request as a stored value of the driver brake request, and the threshold value is determined from the stored value of the driver brake request.

4. The method as claimed in claim 3, wherein the threshold value is formed by linking the stored value of the driver brake request with a tolerance value.

5. The method as claimed in claim 3, wherein a continual update of the threshold value with a current value representing the driver brake request, wherein the updated threshold value forms the basis for the following comparison with a then applicable value of the driver brake request.

6. The method as claimed in claim 5, wherein increases in the driver brake request are not taken into account by the update.

7. The method as claimed in claim 1, further comprising determining a desired deceleration as a value representing the driver brake request.

8. The method as claimed in claim 1, wherein the pressure control mode is terminated depending on a comparison of a current speed of the motor vehicle and a predefined switching speed value.

9. The method as claimed in claim 1, wherein the pressure control mode is terminated after expiry of a predefined duration since revocation of the external brake request.

10. The method as claimed in claim 1, wherein the control unit, in the presence of a blocking tendency of certain wheels, controls or regulates the brake pressure of the respective wheel brakes of the wheels in pressure control mode.

11. The method as claimed in claim 1, wherein the control unit controls the brake pressure at the wheel brakes via a respective pressure control valve, and connects brake circuits of the pressure control valves to a pressure medium store via operation of a respective actuation valve per brake circuit.

12. A brake system of a motor vehicle, the brake system comprising:
a brake cylinder and a pressure control valve configured to be controlled by a control unit, and
a service brake valve configured to be operated by a driver of the motor vehicle, and
a brake signal emitter,
wherein brake pressures in the brake cylinders is configured to be set, in a normal braking mode, depending on an actuation of the service brake valve by the driver and a driver brake request determined via the brake signal emitter,
wherein the brake pressure in the brake cylinder is configured to be set, in a pressure control mode, by the control unit via the respective pressure control valve,
wherein the control unit is configured to receive a brake request which is independent of the driver brake request and to switch into a pressure control mode provided for this case,
wherein a threshold value for termination of the pressure control mode is predefined for the control unit, and the control unit is configured to perform comparisons of a value representing the driver brake request with the threshold value.

13. The brake system as claimed in claim 12, wherein the control unit, in the presence of a blocking tendency of a wheel of the motor vehicle to which the brake cylinder corresponds, controls or regulates the brake pressure of a wheel brakes of the wheel in the pressure control mode.

14. The brake system as claimed in claim 12, wherein the pressure control valves is arranged in one or more brake circuits which can each be connected to a pressure medium store via an actuation valve, wherein the actuation valve is connected electrically to the control unit and is switchable.

15. The brake system as claimed in claim 14, wherein the pressure control valve corresponds to a wheel of an axle of the motor vehicles and another pressure control valve corresponds to another wheels of the axle of the motor vehicle, wherein the pressure control valve and the another pressure control valve are connected to a pressure medium store via a common brake circuit with an actuation valve.

16. A motor vehicle with a brake system as claimed in claim 12.

* * * * *